US006486625B1

(12) United States Patent
Vilou

(10) Patent No.: US 6,486,625 B1
(45) Date of Patent: Nov. 26, 2002

(54) DEVICE FOR CONTROLLING A STARTER FOR A MOTOR VEHICLE

(75) Inventor: Gérard Vilou, Tassin (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 09/622,862

(22) PCT Filed: Dec. 23, 1999

(86) PCT No.: PCT/FR99/03271

§ 371 (c)(1),
(2), (4) Date: Aug. 22, 2000

(87) PCT Pub. No.: WO00/39453

PCT Pub. Date: Jul. 6, 2000

(30) Foreign Application Priority Data

Dec. 23, 1998 (FR) .......................................... 98 16327

(51) Int. Cl.[7] .............................................. H02P 1/00

(52) U.S. Cl. ...................... 318/139; 318/778; 318/782; 318/786; 318/789; 318/783; 318/811

(58) Field of Search ................................ 318/139, 778, 318/782, 786, 789, 783, 811

(56) References Cited

U.S. PATENT DOCUMENTS 4,710,841 A * 12/1987 Bottrell ........................ 361/23
5,057,962 A * 10/1991 Alley et al. ................. 318/783
5,350,992 A * 9/1994 Colter ........................ 318/807
5,434,738 A * 7/1995 Kurszewski et al. ........ 318/786

OTHER PUBLICATIONS

Patent Abstracts of Japan vol. 010, No. 295, Oct. 7, 1986 and JP 61 108870 A (Kiyoshi Nagae) May 27, 1986.
French Search Report dated Aug. 13, 1999.

* cited by examiner

*Primary Examiner*—Karen Masih
(74) *Attorney, Agent, or Firm*—Morgan & Finnegan, LLP

(57) ABSTRACT

A device for controlling the power supply to the electric motor of a starter for a vehicle having a power switch connected in series with the electric motor, units for controlling the power switch, and an auxiliary switch which shorts the electric motor when the power switch is opened, where the auxiliary switch is a static electronic component.

12 Claims, 1 Drawing Sheet

DEVICE FOR CONTROLLING A STARTER FOR A MOTOR VEHICLE

BACKGROUND OF THE INVENTION

The present invention relates to devices for controlling a starter for a motor vehicle.

Traditionally, the power supply to the electric motor of a starter is controlled by an electromagnetic power contact (coil relay) which is actuated as a function of the state of the vehicle's contact switch, either directly or via a management electronic circuit which may or may not be incorporated in the starter.

When the starter is deactivated after the thermal motor has started, the armature does not return to a stationary position immediately. The armature's rotation speed is at a maximum at the moment of deactivation, and it then falls gradually over time. The time taken for such slowing depends on the maximum speed, on the inertia of the armature and on frictional losses.

For conventional starters, the time taken to stop may amount to several seconds, during which the starter emits noise at different frequencies. In general, this noise is irritating because it is easily perceptible inside the vehicle passenger compartment.

To reduce this irritation, attempts are being made to reduce the slowing time so that it is short enough to prevent the structure of the starter and its components from beginning to resonate.

To this end, proposals have already been made to brake the armature of the starter's electric motor mechanically using a friction disk arranged between said armature and a stator bearing.

However, such mechanical braking has the drawback of being permanent and, in particular, of being present throughout the time in which the starter is operating. This considerably reduces the efficiency of the starter.

Furthermore, such braking is not reliable over time, and its effectiveness changes as the frictional parts become worn.

To overcome these drawbacks, proposals have also been made for starter structures in which an auxiliary mechanical contact electrically grounds the power supply terminal of the starter's motor as soon as the starter's power contact returns to its open position.

BRIEF SUMMARY OF THE INVENTION

One aim of the invention is to propose a simpler device which enables the electric motor of a starter for a motor vehicle to be braked reliably over time and does not impair the efficiency of said starter.

In its patent application FR 98-11,550, the applicant has recently proposed a device for controlling the power supply to the electric motor of a starter in which the power contact is not a moving contact, but is a static relay in the form of a controllable electronic component, such as a power transistor.

Another aim of the invention is to propose a solution for braking the electric motor of a starter which may be used in the case where said electric motor is controlled by such a static relay.

To this end, the invention proposes a device for controlling the power supply to the electric motor of a starter for a vehicle, particularly a motor vehicle, having a power switch connected in series with said electric motor, means for controlling said power switch, and an auxiliary switch which shorts said electric motor when the power switch is opened, characterized in that said auxiliary switch is a static electronic component.

This solution enables the slowing of the armature to be governed using a very simple structure.

It is additionally compatible with the use of a static electronic power component to produce the starter's power switch.

Moreover, the device proposed by the invention is advantageously supplemented by the various features below, taken on their own or in all their possible combinations:

- a static electronic component is a transistor;
- the auxiliary switch is controlled by a microcontroller which manages the control of the power supply to the electric motor;
- the static electronic component forming the switch is connected in series with a resistor;
- the static electronic component forming the auxiliary switch is controlled by a pulse-width-modulated pulsed signal;
- the static electronic component forming the switch is controlled in open loop mode;
- the static electronic component forming the switch is controlled as a function of the strength of the current passing through it;
- the device has shunt-type means which are connected to an analog/digital input on the microcontroller and transmit to said input a voltage which is proportional to the strength of the current passing through the static electronic component forming the switch;
- the device has means for turning on the auxiliary switch when the contact switch of the starter and the power contact (K) are open, and for turning it off otherwise.

The invention also relates to a starter for a vehicle, in particular a motor vehicle, having an electric motor, a gearwheel driven by said motor, means for moving said gearwheel from a position of rest to a position in which it engages with a ring gear on the thermal motor, and also to a device of the aforementioned type for controlling the power supply to its electric motor.

BRIEF DESCRIPTION OF THE DRAWINGS

Other features and advantages of the invention are yet to emerge from the description below, which is purely illustrative and nonlimiting and which should be read with reference to the appended figures, in which.

DETAILED DESCRIPTION OF THE INVENTION

Figure 1:
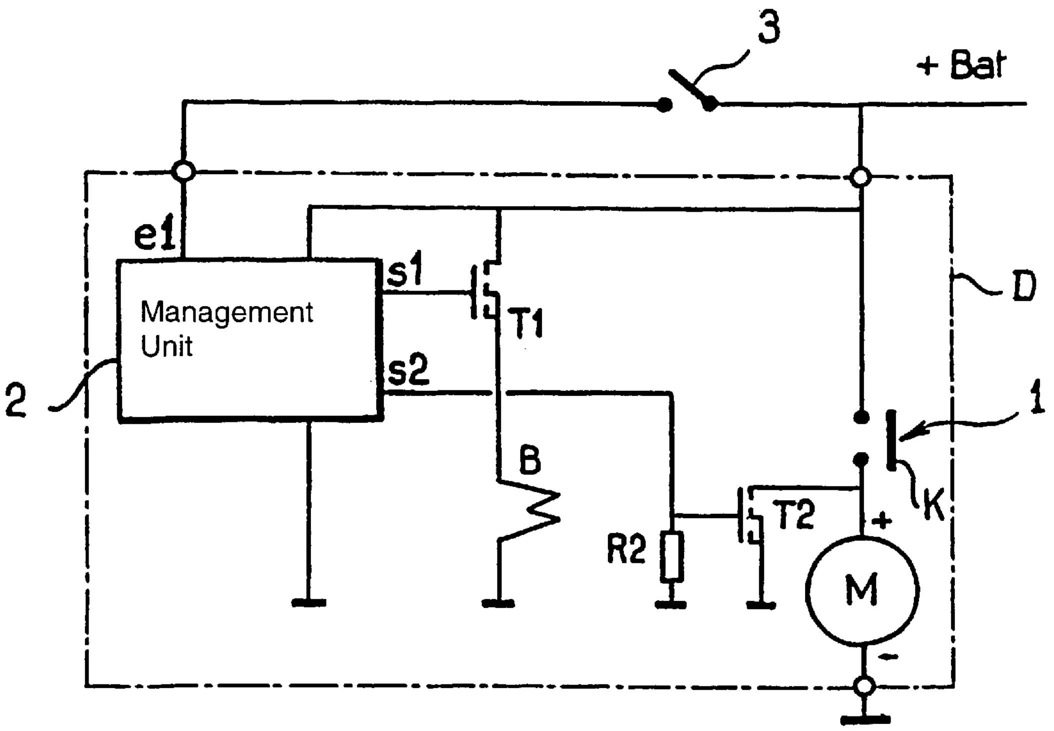
FIG. 1 is a schematic illustration of a starter having a control device in accordance with one possible embodiment of the invention.

The starter D shown in FIG. 1 has an electric motor M and a power contactor 1.

This electric motor M is connected between ground and a terminal +Bat at the battery power supply voltage.

In the particular example shown in the figure, the power contactor 1 is a mechanical relay. It comprises a moving contact K, which is interposed between the power supply terminal +Bat and the motor M, and a coil B which, when supplied with power, moves the starter's gearwheel and closes the contact K.

This coil B is connected between the terminal +Bat and ground in series with a controlled switch T1. By way of example, this switch T1 is a MOSFET-type transistor, the voltage of whose gate is controlled by an output terminal s1 on a management unit 2.

A switch T2 is connected in parallel with the motor M, between the two ends thereof. This switch T2 is also controlled by the management unit 2. By way of example, it is in the form of a MOSFET-type transistor, the voltage of whose gate is controlled by an output terminal s2 on said management unit 2. A resistor R2 connected between the gate of the transistor T2 and ground brings said gate to the same potential as the source of the transistor T2 in the absence of any signal on the output s2.

The management unit 2 is in the form of a microcontroller of which one analog input e1 is connected to the power supply terminal +Bat via a switch 3 which forms the vehicle's starting switch.

The management unit 2 provides various functions:

- analysis of the open or closed state of the starting switch 3 and management of the sequence of the supply of power to the motor M on the basis of this information;
- automatic stopping of the starter when the thermal motor has started; protection of the starter against any overloads or incorrect actions.

This management unit 2 is constantly live and, to this end, is supplied with power, at the voltage delivered by the terminal +Bat by a connection which is independent of that containing the starting switch 3. It incorporates a monitoring system (not shown) which is used to limit power consumption when the vehicle is not operating and thus prevents the battery from discharging too quickly.

The way in which the assembly which has just been described works is as follows.

When the starting switch 3 is closed, for example by actuating the contact key, the monitoring system is inhibited by the appearance of the voltage from the terminal +Bat at the input e1 of the management unit 2, and the starting sequence is activated.

If the starter's various protection functions do not detect any anomaly, the output s1 of the electronic circuit delivers to the gate of T1 a pulse-width-modulated pulsed voltage which is used to supply power to the coil B on the basis of an established current law. First, the voltage delivered controls the gate of the transistor T1 such that a high-strength "surge current" passes through the coil B to move the starter's gearwheel and close the contact K. Secondly, when the gearwheel engages with the thermal motor and the contact K is closed, the gate of the transistor T1 is controlled so as to deliver a lower-strength "holding" current to the coil B.

When the management unit 2 detects that the thermal motor has started, its output s1 changes to the low state and turns off the transistor T1, which deactivates the starter.

At the same time, its output s2 changes to the high state, turning on the transistor T2 and thus shorting the electric motor M. While the armature is rotating, the starter functions as a generator. The kinetic energy of the rotor is dissipated by the Joule effect in the transistor T2, the armature of the motor M and the electrical connections. The armature is then braked rapidly.

However, it is desirable for the deceleration not to be too abrupt, so that the appearance of mechanical overloads, accompanied by noise, is prevented.

To achieve this, a first option is to arrange an additional resistor (not shown) in series with the transistor T2, said additional resistor being used to reduce the short-circuit current.

Another solution is to control the gate of the transistor T2 using a pulse-width-modulated pulsed voltage. The duty cycle of this control voltage can then:

- either satisfy a law of variation stored in the management unit 2 (open-loop control);
- or regulate the short-circuit current by comparing the instantaneous value of this current with a reference value (closed-loop control), "shunt"-type means (not shown) being used to transmit a voltage proportional to the strength of the current passing through the transistor T2 to an analog/digital input on the management unit 2.

Other variants of the invention are possible, of course.

In particular, in one advantageous variant, the contact K is replaced by a static relay, which is a power MOSFET transistor, for example, whose gate is controlled by an output on the management unit 2. The supply of power to the coil B thus merely moves the starter's gearwheel. A device for controlling the supply of power to the electric motor of a starter which has a static relay has already been described in the applicant's patent application FR-98,01150, to which reference will advantageously be made.

Figure 2:
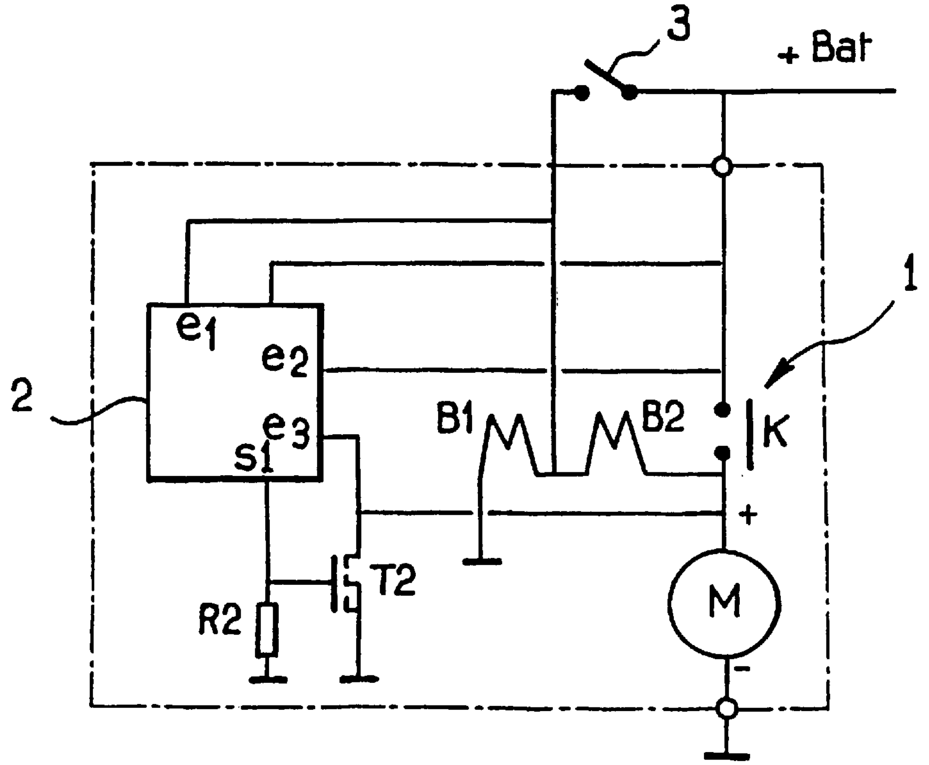
FIG. 2 is a schematic illustration of a starter having a control device in accordance with another possible embodiment of the invention.

In another variant, as illustrated in FIG. 2, the starter's contact switch 3 can control the contact K directly, instead of controlling it via the management unit 2

In the example shown in FIG. 2, the relay 1 has two coils B1, B2, a common point of which is connected to the opposite end of the contact switch 3 from the terminal +Bat. The opposite end of the coil B1 from this common point is connected to ground, while the opposite end of the coil B2 from this common point is connected to a point between the contact K and the motor M.

In the same way as in the assembly in FIG. 1, a MOSFET transistor T2 is connected in parallel between the ends of the motor M.

The voltage of the gate of this transistor T2 is controlled by an output s1 on a management unit 2. This gate is additionally connected to ground via a resistor R2.

This management unit 2 is supplied with power by the terminal +Bat. The voltage at the end of the contact switch 3 is supplied to an input e1 on the management unit 2.

An input e2 on the management unit 2 is supplied with the voltage from the terminal +Bat, and an input e3 on the management unit 2 is supplied with the voltage at a point between the motor M and the power contact K.

Thus, the input e1 on the management unit 2 informs said management unit of the state (open or closed) of the contact key 3.

The voltage difference between the inputs e2 and e3 informs said management unit 2 of the state (open or closed) of the power contact K, by virtue of comparison with a reference threshold Vref.

When the contact switch 3 is closed, a current is established in the coils B1 and B2 which generates a surge magnetic field for the contact K.

When the contact K is closed, the coil B2 is shorted, while the coil B1 holds said power contact K in its closed position.

The transistor T2 is thus controlled by the management unit 2 so that it is turned on when the contact switch 3 and the power contact K are open, and is otherwise closed.

More precisely, the transistor T2 is controlled as shown in the truth table below:

| | | Contact switch state | |
|---|---|---|---|
| | | e1 = 0 | e1 =+ Bat |
| State of | e2–e3 < Vref | T2 off | T2 off |
| contact K | e2–e3 > Vref | T2 on | T2 off |

What is claimed is:

1. A starter associated with a thermal engine, the starter comprising:

an electric motor connected to a power supply;

a power switch connected in series with the electric motor;

a static electronic component connected in parallel with the electric motor and the power supply; and a controller associated with the power switch and the static electronic component, the controlled being configured, when the controller detects that the thermal engine has started, to deactivate the power switch and, at the same time, to activate the static electronic component to short the electric motor.

2. The starter of claim 1, wherein the static electronic component connected in parallel is a transistor.

3. The starter of claim 1, wherein the power switch is a second static electronic power component.

4. The starter of claim 3, wherein the second static electronic component forming the power switch is a transistor.

5. The starter of claim 2, wherein the transistor forming the static electronic component connected in parallel is connected in series with a resistor.

6. The starter of claim 2, wherein the transistor forming the static electronic component connected in parallel is controlled by a pulse-width-modulated pulsed signal.

7. The starter of claim 6, wherein the transistor forming the switch is controlled in open loop mode.

8. The starter of claim 6, wherein the transistor forming the static electronic component connected in parallel is controlled as a function of a current passing through the transistor.

9. The starter of claim 2, wherein the power switch is controlled directly by the vehicle's contact switch, and wherein the device has means for turning on the static electronic component connected in parallel when the contact switch of the starter and the power contact are open, and for turning it off otherwise.

10. The starter of claim 2, wherein the power switch is a second transistor.

11. The starter of claim 3, wherein the transistor forming the static electronic component connected in parallel is controlled by a pulse-width-modulated pulsed signal.

12. The starter of claim 4, wherein the transistor forming the static electronic component connected in parallel is controlled by a pulse-width-modulated pulsed signal.

* * * * *

UNITED STATES PATENT AND TRADEMARK OFFICE

CERTIFICATE OF CORRECTION

PATENT NO. : 6,486,625 B1 
DATED : November 26, 2002
INVENTOR(S) : G. Vilou

It is certified that error appears in the above-identified patent and that said Letters Patent is hereby corrected as shown below:

<u>Column 5,</u>
Line 20, the word “controlled” should be -- controller --.

Signed and Sealed this

Twenty-fifth Day of February, 2003

JAMES E. ROGAN
*Director of the United States Patent and Trademark Office*